United States Patent
Zuccotti et al.

(10) Patent No.: US 8,388,506 B2
(45) Date of Patent: Mar. 5, 2013

(54) SEQUENCING UNIT FOR OPENING DEVICES TO BE GLUED TO SEALED PACKAGES OF POURABLE FOOD PRODUCTS

(75) Inventors: Alessandro Zuccotti, Corlo (IT); Claudio Baldini, Nonantola (IT); Mahmod Tabarte, Munkedal (SE); Lars Skarin, Uddevalla (SE); Anders Gustfasson, Uddevalla (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 109 days.

(21) Appl. No.: 12/159,549

(22) PCT Filed: Dec. 27, 2006

(86) PCT No.: PCT/EP2006/070232
§ 371 (c)(1),
(2), (4) Date: Jun. 27, 2008

(87) PCT Pub. No.: WO2007/074162
PCT Pub. Date: Jul. 5, 2007

(65) Prior Publication Data
US 2009/0044487 A1  Feb. 19, 2009

(30) Foreign Application Priority Data
Dec. 29, 2005  (EP) .................................. 05425936

(51) Int. Cl.
*B65B 61/00* (2006.01)
*B31B 1/58* (2006.01)

(52) U.S. Cl. ....................................................... 493/115

(58) Field of Classification Search .................. 493/114, 493/115; 198/836, 836.1–3, 836.2, 836.3; 53/410, 130.1, 133.1, 138.3, 415, 167, 427
See application file for complete search history.

(56) References Cited

U.S. PATENT DOCUMENTS

| | | | | |
|---|---|---|---|---|
| 2,156,020 A | * | 4/1939 | Lathrop | 198/836.3 |
| 3,012,650 A | * | 12/1961 | Carter | 198/382 |
| 3,142,374 A | * | 7/1964 | Carter | 198/459.4 |
| 4,546,873 A | | 10/1985 | Debenham et al. | |
| 4,880,104 A | * | 11/1989 | Evans et al. | 198/445 |
| 6,030,284 A | * | 2/2000 | Frank | 453/3 |
| 6,557,697 B1 | * | 5/2003 | Bowman | 198/836.3 |

FOREIGN PATENT DOCUMENTS

| | | |
|---|---|---|
| CA | 2 211 915 A1 | 2/1998 |
| EP | 0 331 798 A2 | 11/1988 |
| EP | 0 943 549 A1 | 9/1999 |
| EP | 1 072 518 A | 1/2001 |
| EP | 1 167 011 A | 1/2002 |
| WO | WO 95/30536 A | 11/1995 |

* cited by examiner

*Primary Examiner* — Rinaldi I. Rada
*Assistant Examiner* — John Paradiso
(74) *Attorney, Agent, or Firm* — Buchanan Ingersoll & Rooney PC

(57) ABSTRACT

There is described a sequencing unit (1) operating along a feed path (A) of a succession of opening devices (3) for attachment to respective sealed packages of pourable food products; the unit has: push means (25) interacting at a predetermined rate with the succession of opening devices (3) to feed them along the path (A); and locating means (29) interacting with the opening devices (3) and of variable configuration to maintain opening devices (3) with different geometric characteristics in a predetermined position with respect to the push means (25).

11 Claims, 4 Drawing Sheets

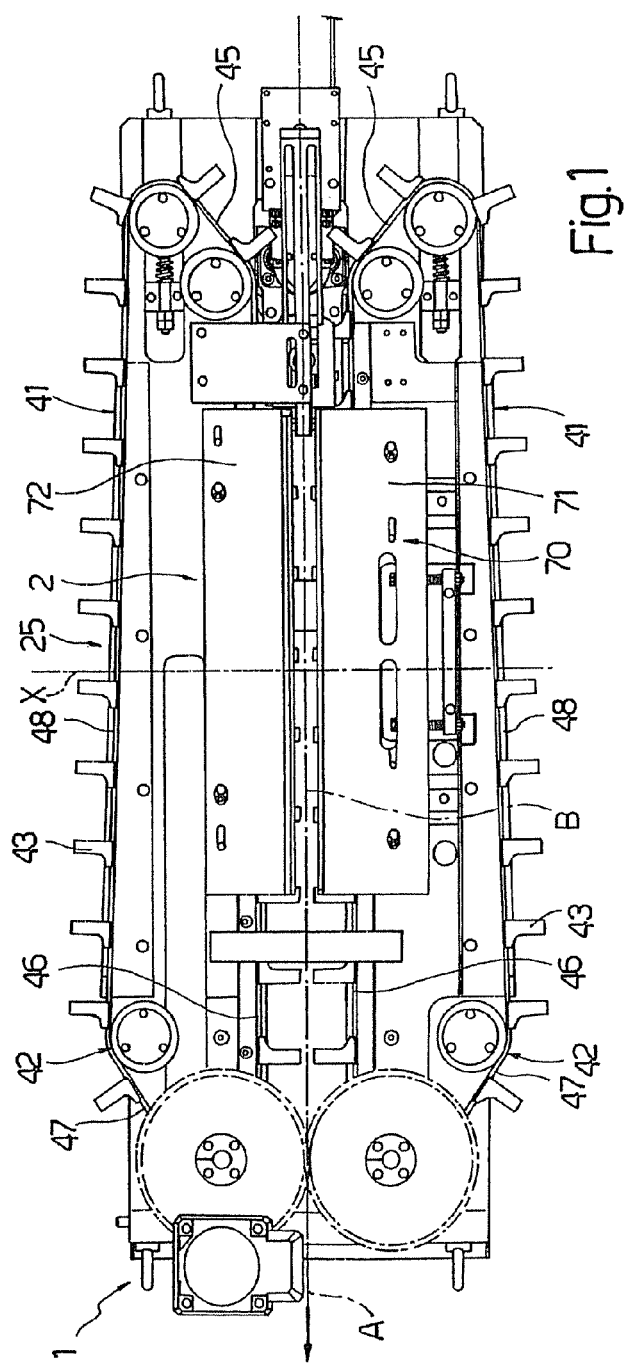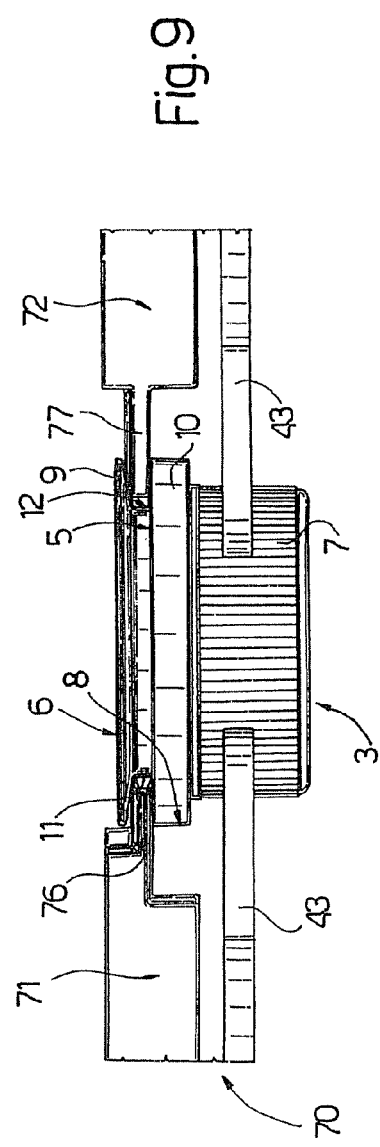

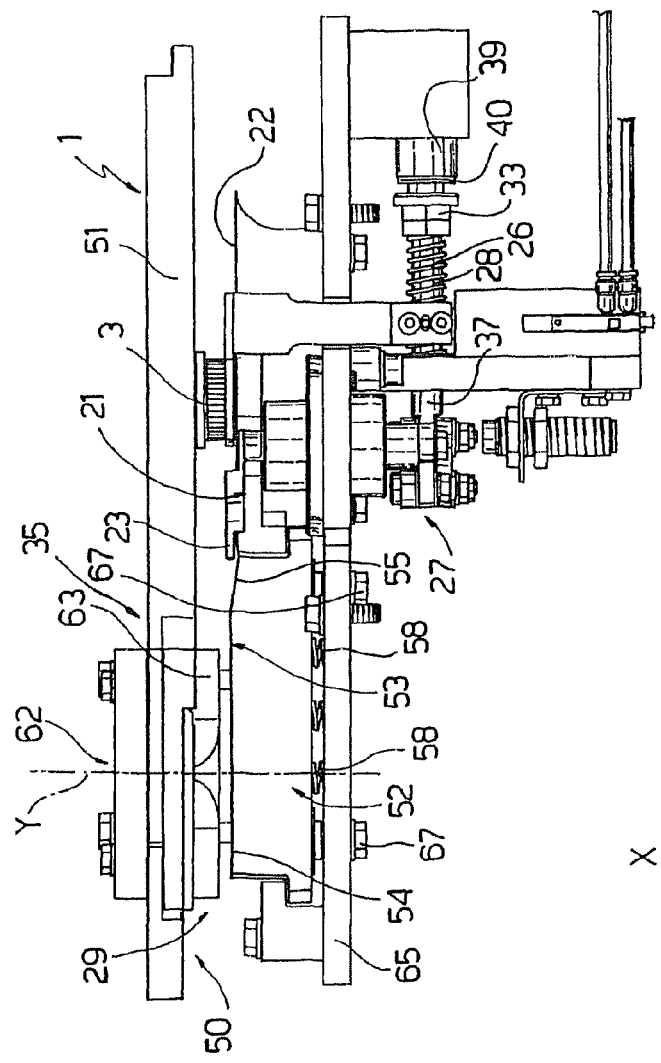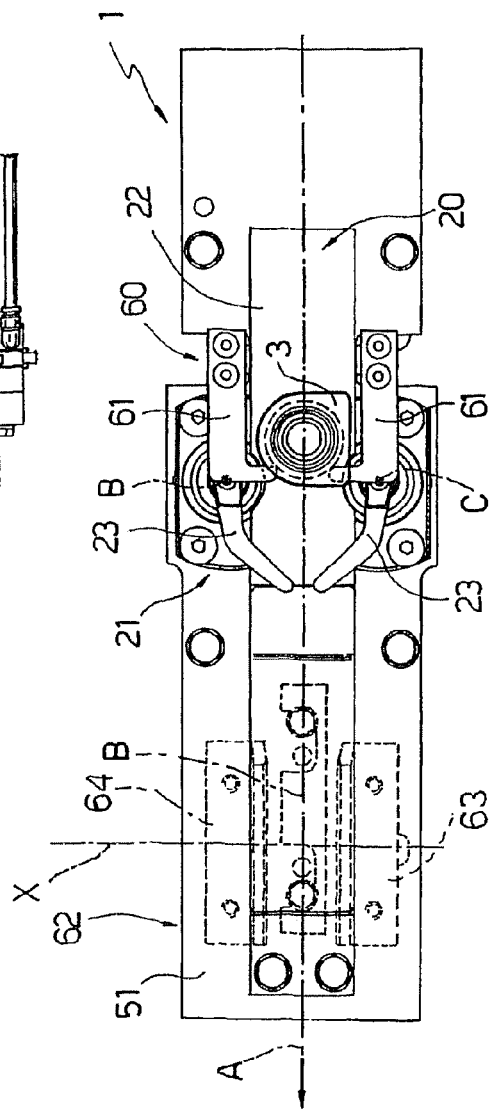

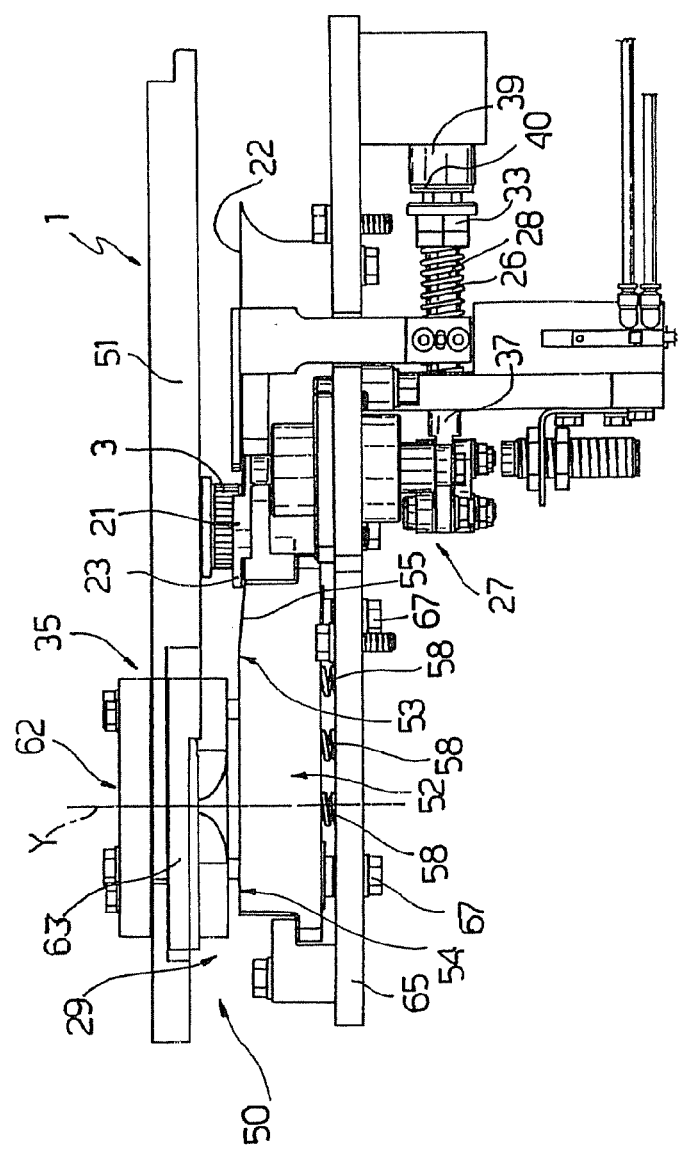
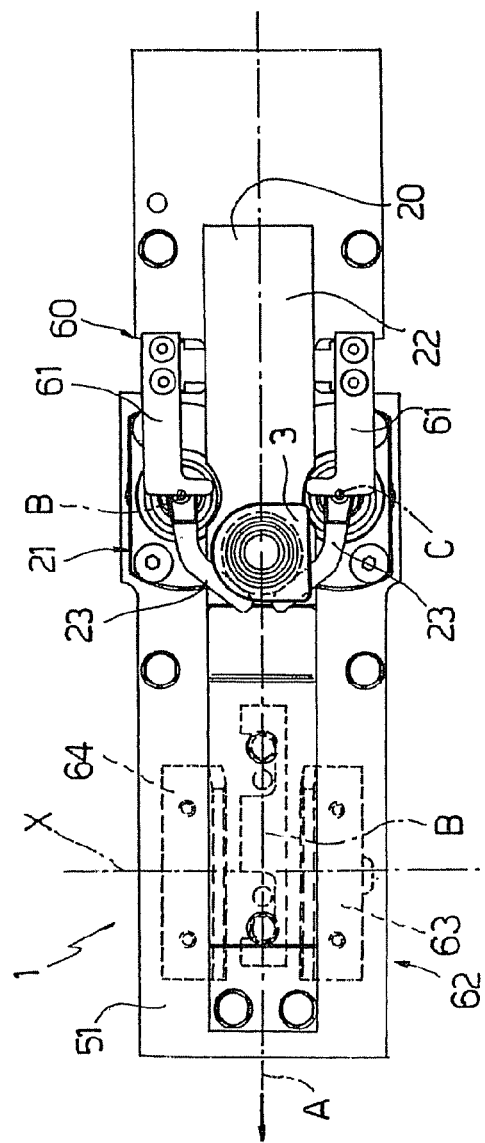

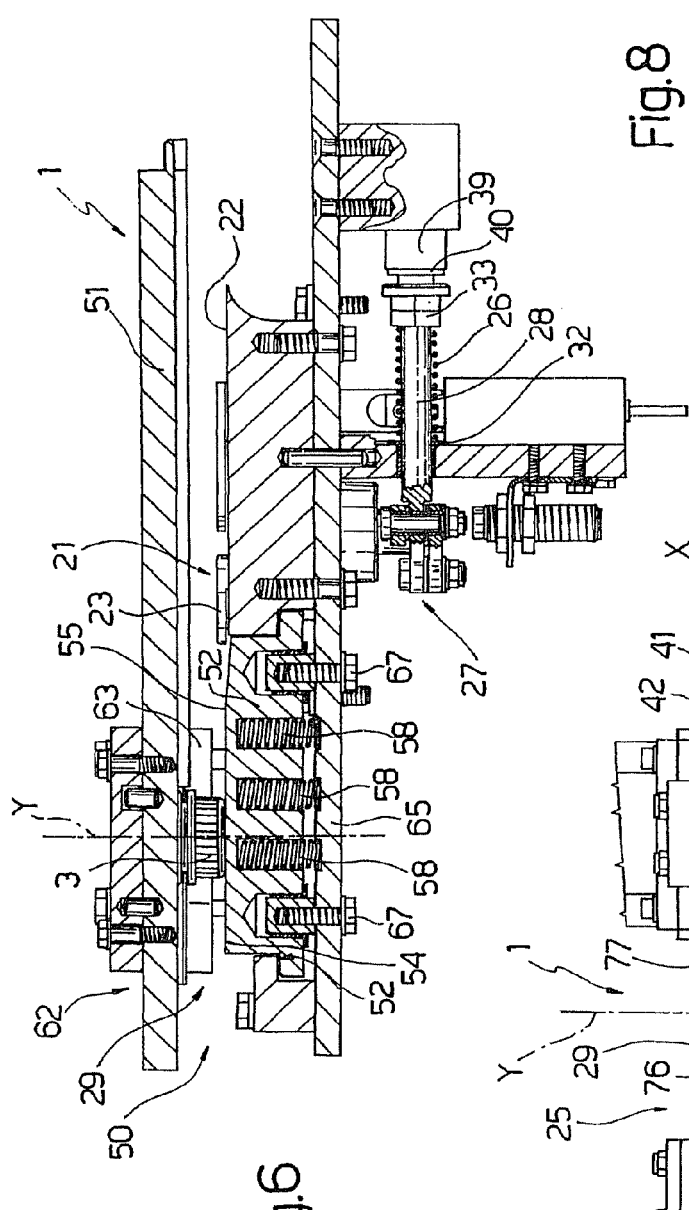
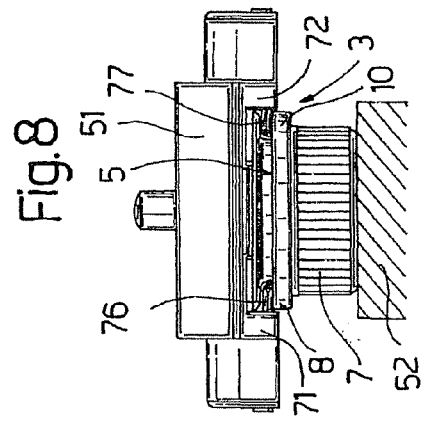
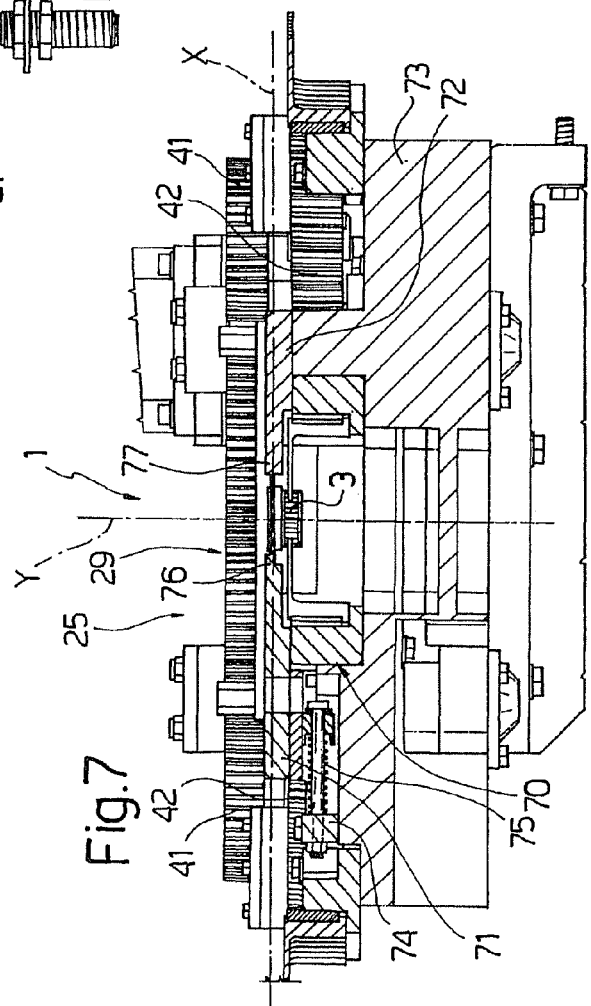
Fig. 6
Fig. 8
Fig. 7

SEQUENCING UNIT FOR OPENING DEVICES TO BE GLUED TO SEALED PACKAGES OF POURABLE FOOD PRODUCTS

TECHNICAL FIELD

The present invention relates to a sequencing unit for opening devices for gluing to sealed packages of pourable food products.

BACKGROUND ART

As is known, many pourable food products, such as fruit juice, UHT (ultra-high-temperature treated) milk, wine, tomato sauce, etc., are sold in packages made of sterilized packaging material.

A typical example of this type of package is the parallelepiped-shaped package for liquid or pourable food products known as Tetra Brik Aseptic (registered trademark), which is made by folding and sealing laminated strip packaging material. The packaging material has a multilayer structure comprising a base layer for stiffness and strength, which may comprise a layer of fibrous material, e.g. paper, or mineral-filled polypropylene material, and which is covered on both sides with layers of thermoplastic material, e.g. polyethylene film. In the case of aseptic packages for long-storage products, such as UHT milk, the packaging material comprises a layer of oxygen-barrier material, e.g. aluminium foil, which is superimposed on a layer of thermoplastic material, and is in turn covered with another layer of thermoplastic material forming the inner face of the package eventually contacting the food product.

As is known, packages of this sort are produced on fully automatic packaging machines, on which a continuous tube is formed from the web-fed packaging material; the web of packaging material is sterilized on the packaging machine, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is filled with the sterilized or sterile-processed food product, and is sealed and subsequently cut along equally spaced cross sections to form pillow packs, which are then folded mechanically to form respective finished, e.g. substantially parallelepiped-shaped, packages.

Alternatively, the packaging material may be cut into blanks, which are formed into packages on forming spindles, and the packages are filled with the food product and sealed. One example of this type of package is the so-called "gable-top" package known by the trade name Tetra Rex (registered trademark).

Once formed, the above packages may undergo further processing, such as the application of a reclosable opening device to protect the food product inside the package from contact with external agents, and to enable the product to be poured out.

At present, the most commonly marketed opening devices comprise an annular frame portion defining a pour opening and fitted about a removable or pierceable portion of a top wall of the package; and a cap hinged or screwed to the frame portion, and which is removable to open the package. Alternatively, other types of opening, e.g. slide-open, devices are also known to be used.

The removable portion of the package may be defined by a sealing sheet glued or heat-sealed to the outside of the package to close a through hole in the package. One example of this solution is described and illustrated in Patent Application EP-A-0943549. Alternatively, the removable portion of the package may be defined by a so-called "prelaminated" hole, i.e. a hole formed in the base layer of the packaging material before covering the base layer with other layers defining the packaging material, e.g. the layers of thermoplastic material and/or the layer of barrier material, which close the hole hermetically. One example of this solution is described and illustrated in Patent Application EP-A-331798.

In both cases, the opening devices are fed from a hopper to an adhesive application unit and subsequently to a gluing unit for gluing each opening device to a respective package.

To improve operation of the adhesive application unit, a need is felt within the industry for a sequencing unit for feeding the opening devices to the application unit in sequence, at predetermined travelling speeds and feed rates, and in a predetermined position to ensure effective, precise application of the adhesive.

More specifically, a need is felt for sequencing units capable of conveying opening devices with different geometric characteristics resulting from the shape and dimensional tolerances involved in the manufacture of the opening devices.

DISCLOSURE OF INVENTION

It is an object of the present invention to provide a sequencing unit for opening devices for gluing to sealed packages of pourable products, designed to meet the above requirement in a straightforward, low-cost manner.

According to the present invention, there is provided a sequencing unit operating along a feed path of a succession of opening devices for attachment to respective sealed packages of pourable food products; said unit being characterized by comprising:

push means interacting at a predetermined rate with said succession of opening devices to feed them along said path; and
 locating means interacting with said opening devices and of variable configuration to maintain opening devices with different geometric characteristics in a predetermined position with respect to said push means.

BRIEF DESCRIPTION OF THE DRAWINGS

A preferred, non-limiting embodiment of the present invention will be described by way of example with reference to the accompanying drawings, in which:

FIG. 1 shows a top plan view of a sequencing unit in accordance with the invention;

FIGS. 2 and 3 show side views, with parts removed for clarity, of the FIG. 1 sequencing unit in a first and second operating condition respectively;

FIGS. 4 and 5 top plan views, with parts removed for clarity, of the FIG. 1 sequencing unit in the first and second operating condition respectively;

FIG. 6 shows a side section of the FIG. 1 unit in a third operating condition;

FIG. 7 shows a rear section of the FIG. 1 unit in the third operating condition;

FIG. 8 shows a larger-scale detail of FIG. 7;

FIG. 9 shows a larger-scale detail of FIG. 8.

BEST MODE FOR CARRYING OUT THE INVENTION

With reference to FIGS. 1 to 7, number 1 indicates as a whole a sequencing unit for opening devices 3, which may be incorporated in a known pourable food product packaging machine (not shown) of the type described in the introduction.

More specifically, unit 1 operates along a feed path A of opening devices 3. Path A is traveled by each opening device 3 in the direction indicated in FIGS. 1, 4 and 5, and extends from a hopper (not shown), located upstream from unit 1 along path A, to a number of units (not shown), which form part of the packaging machine, interact with opening devices 3, and are located downstream from unit 1 along path A, such as a unit for depositing adhesive on opening devices 3, and a unit for gluing each opening device 3 to a respective package (not shown).

Non-limiting examples of the packages produced on packaging machines of the above type are the parallelepiped-shaped packages known by the trade name Tetra Brik Aseptic (registered trademark) or so-called "gable-top" packages known by the trade name Tetra Rex (registered trademark).

The packaging material of the packages has a multilayer structure (not shown) comprising a base layer of fibrous material, e.g. paper, or mineral-filled polypropylene, covered on both sides with layers of thermoplastic material, e.g. polyethylene film. In the case of aseptic packages for long-storage products, such as UHT milk, the packaging material comprises a layer of oxygen-barrier material, e.g. aluminium foil, which is superimposed on a layer of thermoplastic material, and is in turn covered with another layer of thermoplastic material forming the inner face of the package eventually contacting the food product.

Opening device 3 is applied to a removable portion of a respective package (not shown), i.e. a portion that can be detached from the rest of the package to enable the pourable product to be poured out.

The removable portion may be defined by a sealing sheet glued or heat-sealed to the package to close a through hole in the package. Alternatively, the removable portion may be defined by a so-called "prelaminated" hole, i.e. a hole formed in the base layer of the packaging material and closed hermetically by other layers defining the packaging material (at least the layers of thermoplastic material).

With particular reference to FIGS. 8 and 9, device 3 substantially comprises a tubular frame portion 5 defining a pour opening 6, and which is glued to a wall of a respective package so that pour opening 6 is located at the removable portion; and a cap 7, which is screwed externally to one end of a lateral surface 8 of frame portion 5 to close opening 6, and is removable from frame portion 5 to pour out the food product.

More specifically, at opposite ends, surface 8 of each opening device 3 comprises a projection 9 which is glued to the respective package, and a threaded portion (not shown in FIGS. 8 and 9) by which to screw/unscrew cap 7.

Surface 8 also comprises a projection 10 located in an intermediate position between the threaded portion and projection 9; and a connecting portion 11 connecting projections 9 and 10.

More specifically, portion 11 is smaller radially than projections 9 and 10, and is connected on opposite sides to projections 9 and 10 so as to define an annular recess 12.

Along path A, unit 1 comprises a first conveyor 20 for conveying opening devices 3 arranged in a line; and a releasable stop unit 21, which interacts with opening devices 3 downstream from conveyor 20, is normally set to a first configuration arresting opening devices 3 along path A, and is movable into a second configuration permitting travel of opening devices 3.

Advantageously, unit 1 also comprises push means 25 (FIG. 1) interacting at a predetermined rate with said succession of opening devices 3 to feed them along said path A downstream from stop unit 21; and locating means 29 interacting with said opening devices 3 and of variable configuration to maintain opening devices 3 with different geometric characteristics in a predetermined position with respect to said push means 25.

More specifically, conveyor 20 receives opening devices 3 from the hopper and from a device (not shown) for arranging opening devices 3 in a line and making them available to conveyor 20.

Conveyor 20 defines a flat surface 22 connected operatively to a motor (not shown) and movable parallel to path A to convey opening devices 3. More specifically, surface 22 conveys opening devices 3 arranged in a line, and each positioned with respective cap 7 contacting surface 22, and with respective projection 9 free.

With particular reference to FIGS. 4 and 5, unit 21 comprises two arms 23 rotating about respective axes B, C parallel to each other and extending perpendicular to path A. Each arm 23 can be set to a first angular position, in which it cooperates with a respective opening device 3 to arrest opening device 3 along path A and prevent it being fed through unit 21, and a second angular position, in which it is detached from respective opening device 3 to allow it through unit 21 and along path A.

More specifically, arms 23 are arc-shaped to cooperate with an outer portion of opening devices 3.

Unit 21 also comprises a spring 26 (FIGS. 2, 3 and 6) for elastically loading arms 23 into said first angular position; and a lever mechanism 27 (FIG. 5) connecting a cylinder 28, supporting spring 26, operatively to both arms 23.

More specifically, cylinder 28 has an axis extending parallel to path A; a first axial end 37 connected to lever mechanism 27; and a second axial end (not shown in FIGS. 2 and 3) opposite end 37 and which slides inside a fixed structure of unit 1. More specifically, the second end of cylinder 28 is screwed to a nut 33 surrounding the second end.

Spring 26 is a helical spring, extends parallel to path A, and is wound coaxially on cylinder 28. More specifically, spring 26 is interposed between a projection 32 and nut 33 surrounding cylinder 28 coaxially.

When subjected to external force, cylinder 28 slides in a first direction parallel to path A, so as to move nut 33 towards projection 32 and compress spring 26; and when the external force is removed, spring 26 expands to slide cylinder 28 in a second direction opposite the first, and so move nut 33 away from projection 32.

By means of cylinder 28 and projection 32, lever mechanism 27 converts expansion/contraction of spring 26 into rotation of arms 23 about respective axes B, C.

More specifically, lever mechanism 27 converts rotation, by opening devices 3, of each arm 23 from the first to the second angular position into contraction of spring 26 from a least-compressed position of spring 26; and converts expansion of spring 26, from a fully-compressed position of the spring, into rotation of each arm 23 from the second to the first angular position.

The position of nut 33 is adjustable selectively from the outside to adjust the preload of spring 26 and therefore elastic loading of arms 23 into the first angular position. More specifically, turning nut 33 on cylinder 28 in a first direction stretches spring 26 to reduce the preload; and conversely, turning nut 33 on cylinder 28 in the opposite direction further compresses spring 26 to increase the preload.

Unit 21 also comprises a nut 40 coaxially surrounding cylinder 28, and which can be screwed on cylinder 28 to translate cylinder 28 parallel to path A.

Screwing/unscrewing nut 40 on cylinder 28 adjusts the position of end 37 of cylinder 28, and therefore the angle between a fixed direction integral with each arm 23 and path A, when arm 23 is in the first angular position.

Nut 40 is integral with a damper 39 preferably made of elastomeric material and for damping vibration of unit 21 and so reducing the operating noise level and prolonging the working life of unit 21.

With reference to FIG. 1, push means 25 comprise two conveyors 41, which cooperate at predetermined intervals with opening devices 3 to push opening devices 3 against unit 21 and to move arms 23 from the first to the second angular position and so compress spring 26 from the least-compressed position.

Conveyors 41 continue cooperating with opening devices 3, even after opening devices 3 are fed through unit 21, to push them along path A to the units downstream from unit 1.

Each conveyor 41 is located on a respective side of path A, and comprises an endless toothed belt 42 (driven by a motor not shown); and a number of paddles (only one shown and indicated 43) projecting from belt 42, outwards of the loop defined by the belt.

As belts 42 operate, paddles 43 of each belt 42 travel along an endless path comprising:
  a first portion 45 converging with respect to path A, and along which each paddle 43 approaches and impacts each opening device 3 retained by unit 21;
  a second portion 46 parallel to path A, and along which each paddle 43 guides said opening device 3 downstream from unit 21;
  a third portion 47, along which each paddle 43 withdraws from said opening device 3; and
  a fourth portion 48 sloping with respect to path A, and along which paddles 43 are fed back.

Each paddle 43 is substantially L-shaped, with a short leg fixed to respective belt 42, and a long leg interacting with opening devices 3.

Locating means 29 are located downstream from unit 21 along path A, and provide for maintaining opening devices 3 in contact with paddles 43 of each conveyor 41, to make opening devices 3 available in a predetermined position to the units downstream from unit 1 along path A.

More specifically, locating means 29 provide for maintaining in contact with paddles 43 opening device 3 with different geometric characteristics resulting from the shape and dimensional tolerances involved in the manufacturing process.

Locating means 29 comprise a first pair 50 of guides 51, 52 facing each other and cooperating with each opening device 3 to position it with respect to paddles 43 of conveyors 41 in a direction Y perpendicular to path A and vertical in use. Locating means 29 also comprise a second pair 70 of guides 71, 72 facing each other and cooperating, downstream from pair 50 along path A, with each opening device 3 to position it with respect to paddles 43 of the conveyors in a direction X perpendicular to direction Y and path A and horizontal in use.

More specifically, second pair 70 of guides 71, 72 extends along an end portion B of path A located downstream, along path A, from first pair 50 of guides 51, 52.

As they travel along path A, opening devices 3 therefore cooperate first with guides 51, 52 and then with guides 71, 72, so as to be positioned in both directions X, Y.

Guides 51, 52 cooperate with projection 9 and cap 7 of opening device 3 respectively.

Guide 52 cooperates with cap 7 to push opening device 3 against guide 51 and position the opening device with respect to paddles 43 in direction Y.

More specifically, guide 51 is fixed to a first fixed portion (not shown) of unit 1, while guide 52 is secured elastically to a second fixed portion 65 of unit 1 to compensate for any shape and dimensional tolerances of opening devices 3 in direction Y.

Guide 51 extends horizontally and parallel to surface 22, while guide 52 defines a surface 53, which, at the opposite end to unit 21, comprises a portion 54 parallel to surface 22, and, between portion 54 and unit 21, comprises a portion 55 sloping with respect to surface 22.

More specifically, the distance, in direction Y, between portion 54 and guide 51 is smaller than the vertical distance between guide 51 and surface 22, while portion 55 slopes with respect to surface 22.

The distance between guides 51, 52 in direction Y therefore decreases along path A to ensure projection 9 always rests against guide 51 as opening devices 3 travel along portion 54.

Portion 55 is inclined so that, as they travel along portion 55, opening devices 3 are moved towards guide 51 in direction Y by an amount depending on the mean value of the dimensional tolerances of opening devices 3.

Guide 52 is connected to portion 65 of unit 1 by a number of—in the example shown, three—springs 58 loaded towards guide 51.

More specifically, each spring 58 is a helical spring, has an axis parallel to direction Y, and is interposed between portion 65 and guide 52.

Guide 52 is also fixed to portion 65 by two pins 67 for positioning guide 52 with respect to portion 65.

Finally, the distance, in direction Y, between guides 51, 52 is adjustable, so guides 51, 52 can be used with opening devices 3 with shape and dimensional tolerances over and above a given value.

Along portion B, guides 71, 72 cooperate, on opposite sides of path A and in direction X, with surface 8 of each opening device 3.

More specifically, guide 71 cooperates with surface 8 to push opening device 3 against guide 72 and position the opening device with respect to paddles 43 in direction X.

More specifically, guide 71 is secured elastically to a portion 74 of unit 1 (FIGS. 7 to 9), and, on the opposite side to portion 74, comprises an appendix 76 which cooperates with recess 12 to push opening device 3 against guide 72.

More specifically, guide 71 is secured to portion 74 of unit 1 by a helical spring 75 loaded towards guide 72 and having an axis parallel to direction X.

Guide 72 is fixed to a portion 73 of unit 1, and, on the opposite side to portion 73, comprises an appendix 77 which cooperates with recess 12 to maintain opening device 3 in a predetermined position with respect to paddles 43 by means of guide 71.

More specifically, portion 73 is located on the opposite side of path A to portion 74.

Locating means 29 also comprise a further pair 62 of guides 63, 64 for guiding surface 8 of each opening device 3 as opening device 3 is guided by guides 71, 72 along portion B of path A.

More specifically, guides 63, 64 extend parallel to guides 71, 72, on opposite sides of path A, and are each fixed to unit 1.

Unit 1 also comprises a further stop unit 60 (shown in FIGS. 4 and 5) for arresting opening devices 3 upstream from unit 21 along path A, and arresting supply of opening devices 3 along path A when package supply to the units downstream from unit 1 is temporarily cut off.

Unit 60 comprises two L-shaped members 61 located on opposite sides of opening devices 3, and which do not interfere with opening devices 3 in normal operating conditions.

Members 61 are selectively movable towards each other in a direction perpendicular to path A to interfere with and arrest opening devices 3 before they reach unit 21.

In actual use, opening devices 3 are conveyed in a line by conveyor 20, with cap 7 contacting surface 22, and with projection 9 facing freely away from surface 22.

Opening devices 3 carried on conveyor 20 are arrested by unit 21 (FIG. 5), which is normally set to the first configuration. More specifically, arms 23 of unit 21 are set to the first angular position to arrest opening devices 3 along path A; and spring 26 is in the least-compressed position.

Conveyors 41 interact cyclically with each opening device 3 arrested by arms 23, so as to first move arms 23 into the second angular position, thus compressing spring 26, and then feed opening devices 3 downstream from unit 21 in sequence and at a predetermined rate.

More specifically, each opening device 3 is pushed against arms 23 by a respective pair of corresponding paddles 43, each moved by a relative belt 42. More specifically, corresponding paddles 43 of relative conveyors 41 are moved towards each other and impact respective opening device 3 along relative portions 45.

The force exerted by each opening device 3 on arms 23 moves arms 23 from the first to the second angular position.

As arms 23 move from the first to the second angular position, lever mechanism 27 translates cylinder 28 in a first direction to contract spring 26 from the least- to the fully-compressed position.

Once the force exerted by opening device 3 on arms 23 is removed, spring 26 expands, thus translating cylinder 28 in a second direction opposite the first, and restoring arms 23 from the second to the first angular position by means of lever mechanism 27.

At this point, corresponding paddles 43 of conveyors 41 continue cooperating with respective opening device 3 along relative portions 46, and push the opening device 3 downstream from unit 21 along path A between guides 51, 52.

More specifically, paddles 43 of conveyors 41 push each opening device 3 first along portion 55 and then along portion 54 of guide 52.

By virtue of the slope of portion 55, projection 9 and cap 7 of each opening device 3 along portion 54 cooperate with guides 51, 52 respectively.

Being loaded elastically towards guide 51, guide 52 pushes each opening device 3 against guide 51 to maintain the opening device in a predetermined position with respect to paddles 43 in direction Y.

Along portion B of path A, opening devices 3 are also guided laterally by guides 63, 64.

Downstream from portion B, each opening device 3 travels between pair 70 of guides 71, 72, which guide opening device 3 along path A and set it to a predetermined position, in direction X, with respect to paddles 43, to compensate for any shape and dimensional tolerances of opening devices 3 in direction X.

More specifically, each guide 71, 72 guides opening device 3 downstream from portion B by means of relative appendix 76, 77.

Moreover, being loaded elastically by spring 75 towards guide 72, guide 71 pushes each opening device 3 against guide 72 to position the opening device with respect to paddles 43 in direction X.

Once set to the predetermined position with respect to paddles 43 in both directions X, Y, opening devices 3 can be fed to the units downstream from unit 1 along path A.

By activating unit 60 (FIGS. 2 and 4) so that members 61 interact with opening devices 3, supply of opening devices 3 to unit 21 can be cut off in the event package supply to the units downstream from unit 21 is temporarily cut off. During operation of unit 1, the elastic load on arms 23 can be adjusted by screwing nut 33 on cylinder 28.

During operation of unit 1, the angle between each fixed direction integral with respective arm 23 and path A can also be adjusted by screwing/unscrewing nut 40 on cylinder 28.

The advantages of unit 1 according to the present invention will be clear from the foregoing description.

In particular, unit 1 provides for feeding the units downstream from unit 1 along path A with opening devices 3 having different geometric characteristics, as a result of the shape and dimensional tolerances involved in the manufacture of opening devices 3.

Moreover, opening devices 3 are conveyed in sequence, at predetermined rates and travelling speeds, and in a predetermined position, in directions X, Y, with respect to paddles 43 of conveyors 41.

As a result, adhesive is deposited correctly and effectively by the adhesive application unit downstream from unit 1.

Clearly, changes may be made to unit 1 without, however, departing from the protective scope as defined in the accompanying Claims.

The invention claimed is:

1. A sequencing unit operating along a feed path of a succession of opening devices for attachment to respective sealed packages of pourable food products comprising:

push means positioned along opposite sides of said feed path to interact at a predetermined rate with said succession of opening devices for feeding the opening devices along said feed path; and locating means interacting with said opening devices and of variable configuration for maintaining the opening devices with different geometric characteristics in a predetermined position with respect to said push means, the locating means comprising a first pair of guides cooperating with the opening devices to position the opening devices with respect to the push means in a first direction crosswise to the feed path, the first pair of guides comprising spaced apart first and second guides between which the opening devices are fed by the push means, the first and second guides contacting oppositely facing surfaces of each opening device, the first guide being secured to a fixed portion of the unit so as to be fixed in position, and first elastic means urging the second guide towards the first guide and permitting the second guide to elastically move away from the first guide as each opening device is fed between the first and second guides to adapt to the geometric characteristics of each opening device, a distance between the first and second guides of the first pair of guides, measured parallel to the first direction, decreasing along the feed path.

2. A unit as claimed in claim 1, wherein the first and second guides of the first pair are vertically spaced apart, the second guide of the first pair of guides including a horizontal first portion and a second portion connected to the horizontal first portion, the second portion of the second guide being inclined upward and merging with the horizontal first portion of the second guide so that each opening device fed between the first and second guides moves up the second portion of the second guide to the horizontal first portion of the second guide, the first guide being horizontal and parallel to the horizontal first portion of the second guide.

3. A unit as claimed in claim 1, wherein said locating means comprise a second pair of guides cooperating with said opening devices to position the opening devices with respect to said push means in a second direction crosswise to said first direction and said path; said guides in said second pair including horizontally spaced apart third and fourth guides, the third guide being biased by second elastic means toward the fourth guide so that a distance between the third and fourth guides is variable to adapt to the geometric characteristics of each said opening device.

4. A unit as claimed in claim 3, wherein each of said first and second elastic means is a spring.

5. A unit as claimed in claim 3, wherein said first pair of guides extends upstream from said second pair of guides along said path.

6. A sequencing unit operating along a feed path of a succession of opening devices for attachment to respective sealed packages of pourable food products comprising:
   a pair of horizontally spaced apart endless belts, a plurality of paddles connected to each respective endless belt and extending outwardly away from the respective endless belt, each paddle on one belt being paired with one of the paddles on the other belt to form two paired paddles that contact an upstanding wall of a respective one of the opening devices for advancing the opening devices along the feed path; and
   first and second vertically spaced apart guides positioned to contact a top surface and a bottom surface respectively of each of the opening devices to position the opening devices relative to the paddles in a first direction crosswise to the path, one of the first and second guides being movable relative to the other of the first and second guides to vary a distance between the first and second guides to accommodate the opening devices with different geometric characteristics and maintain the opening devices with the different geometric characteristics in a predetermined position with respect to the paddles, the first guide possessing a surface which is contacted by each opening device, the second guide possessing one surface portion and an other surface portion which are both contacted by each opening device, the surface of the first guide being parallel to the one surface portion of the second guide, the other surface portion of the second guide being inclined with respect to the one surface portion of the second guide so that a distance between the surface of the first guide and the other surface portion of the second guide measured parallel to the first direction decreases along the path.

7. A unit as claimed in claim 6, wherein the first guide is secured to a fixed portion of said unit so that the first guide is fixed in position relative to the second guide, and the second guide is biased by a plurality of springs towards the first guide.

8. A unit as claimed in claim 7, further comprising a third guide and a fourth guide, the third and fourth guides contacting different portions of the opening devices to position the opening devices with respect to the paddles in a second direction crosswise to the first direction and the path.

9. A unit as claimed in claim 8, wherein the third and fourth guides are relatively movable in a direction toward and away from one another to adapt to the geometric characteristics of each of the opening devices.

10. A unit as claimed in claim 8, wherein the third guide is secured to a fixed portion of the unit to be fixed in position, and the fourth guide is urged by a spring toward the third guide.

11. A unit as claimed in claim 8, wherein the first and second guides are positioned upstream from the third and fourth guides along the feed path.

* * * * *